(12) United States Patent
Cichetti, Sr. et al.

(10) Patent No.: US 6,932,579 B2
(45) Date of Patent: Aug. 23, 2005

(54) RATCHET ASSEMBLY FOR ELECTRIC FAN

(75) Inventors: Michael D. Cichetti, Sr., Springfield, PA (US); Paul W. Orr, Coatesville, PA (US)

(73) Assignee: Lasko Holdings, Inc., Wilmington, DE (US)

( * ) Notice: Subject to any disclaimer, the term of this patent is extended or adjusted under 35 U.S.C. 154(b) by 348 days.

(21) Appl. No.: 10/225,221

(22) Filed: Aug. 21, 2002

(65) Prior Publication Data

US 2004/0037704 A1 Feb. 26, 2004

(51) Int. Cl.$^7$ .................................................. B63H 1/28
(52) U.S. Cl. .................................... 416/246; 416/244 R
(58) Field of Search ............................ 416/244 R, 246, 416/207 R; 403/92, 94, 97; 248/291.1, 291.12

(56) References Cited

U.S. PATENT DOCUMENTS

| | | | |
|---|---|---|---|
| 2,129,933 A | * | 9/1938 | Hueglin |
| 2,618,434 A | * | 11/1952 | Lawrence ................... 416/100 |
| 2,650,019 A | | 8/1953 | Lautner et al. |
| 2,911,245 A | * | 11/1959 | Rudolf ........................ 403/95 |
| 4,121,605 A | * | 10/1978 | Schmerl ...................... 135/65 |
| 4,732,539 A | | 3/1988 | Shin-Chin |
| 4,799,858 A | | 1/1989 | Shin-Chin |
| 4,815,740 A | * | 3/1989 | Williams et al. |
| 5,018,951 A | | 5/1991 | Wang |
| 5,265,969 A | * | 11/1993 | Chuang |
| 5,429,481 A | * | 7/1995 | Liu |
| 5,435,696 A | * | 7/1995 | Cunning |
| 5,617,592 A | * | 4/1997 | Cheng |
| 6,079,949 A | * | 6/2000 | Litvin |

FOREIGN PATENT DOCUMENTS

| | | |
|---|---|---|
| JP | 56-135792 | * 10/1981 |
| JP | 63-131895 | * 6/1988 |

OTHER PUBLICATIONS

PCT International Search Report for Application No. PCT/US 03/25493, mailed Mar. 12, 2004.

\* cited by examiner

*Primary Examiner*—Hoang Nguyen
(74) *Attorney, Agent, or Firm*—RatnerPrestia (57) ABSTRACT

A ratcheting mechanism for a fan having a base and a head assembly. The ratcheting mechanism has a pivot having a portion for coupling with the fan head assembly; a member disposed within a portion of the pivot; a extension portion having side walls spaced apart from one another, the pivot and member disposed between the side walls of the extension portion; a pin having a lower portion seated within a base portion of the extension portion, an upper portion of the pin resiliently placed against the collar; and a coupling placed through a central portion of the side walls and the pivot for compressing the side walls against the pivot to maintain a position of the fan head assembly and allowing bi-directional pivoting of the pivot relative to the extension portion in a range of greater than 45 degrees absent a tightening and a loosening of the coupling.

37 Claims, 14 Drawing Sheets

RATCHET ASSEMBLY FOR ELECTRIC FAN

FIELD OF THE INVENTION

This invention relates to a fan of the type which has a fan motor assembly carried on a single ratchet assembly for selective positioning of the fan. More specifically, the present invention relates to a ratchet assembly for a fan that allows the head of the fan to tilt relative to its base.

BACKGROUND OF THE INVENTION

Fans, such as pedestal fans, are well known in the art. Such fans allow positioning of the fan above the floor, and usually have a yoke attached to tubing which is carried in a base; the yoke being attached to the fan by a pair of thumbscrews, which extend through the ends of the yoke into captive nuts in the grills surrounding the fan blades. An example of such fans is shown in my prior U.S. Pat. No. 5,368,445. While these fans are satisfactory, the yoke style of mounting the fan requires that the two thumbscrews be loosened to rotate the fan and then tightened. Due to the frictional forces between the yoke and the thumbscrews, these fans may not stay in the position where they are placed and the fan may rotate to an undesirable position due to loosening of the thumbscrews.

Conventional pedestal fans include a counter balance spring to maintain the position of the fan head and a thumbscrew arrangement requiring the user to loosen the thumbscrew to reposition the fan head followed by a re-tightening of the thumbscrew to secure the fan head in position. This has disadvantages, however, in that the degree of pivoting was limited to less that 45 degrees due to the torsional pressure exerted by the counter balance spring, in addition to the extra steps required by the user in the loosening/tightening operations.

It is desirable to reduce the number of parts and to provide a fan that can be tilted without the necessity of loosening or tightening any thumbscrews, and which fan is retained in the position where it is placed.

The fan of the present invention can be readily positioned for airflow and the direction maintained or varied as desired without the use of a counterbalance spring or a thumbscrew, and which provides other positive advantages.

SUMMARY OF THE INVENTION

In view of the shortcomings of the prior art, the present invention provides a ratcheting mechanism that allows a fan head to be tilted relative to its base, without the need for loosening and tightening of bolts or other securing mechanisms.

The present invention is a ratcheting mechanism for a fan. The ratcheting mechanism has a pivot having a portion for coupling with a fan head assembly; a member disposed within a portion of the pivot; a extension portion having side walls spaced apart from one another, the pivot and member disposed between the side walls of the extension portion; a pin having a lower portion seated within a base portion of the extension portion, an upper portion of the pin resiliently placed against the member; and a coupling placed through a central portion of the side walls and the pivot for compressing the side walls against the pivot to maintain a position of the fan head assembly and allowing bi-directional pivoting of the pivot relative to the extension portion in a range of greater than 45 degrees absent a tightening and a loosening of the coupling.

According to another aspect of the invention, the coupling maintains a predetermined compression of the side walls against the pivot after repetitive pivoting operations.

According to still another aspect of the present invention, the coupling maintains a position of the fan head assembly absent a counterbalance spring.

According to yet another aspect of the invention, the member has a plurality of ridges spaced apart from one another along a length of the member, the upper portion of the pin disposed between a pair of the plurality of ridges to maintain a position of the pivot relative to the extension portion.

According to a further aspect of the invention, a spring is placed between the lower portion of the pin and the base portion of the extension portion to maintain positive pressure by the upper portion of the pin against the member.

According to still another aspect of the present invention, a first stop is provided at a first position on the pivot and a second stop is provided at a second position on the pivot to limit the tilting range of the fan head.

According to yet another aspect of the present invention, the coupling includes a first cover having a central portion extending from a rear side thereof, the first cover coupled to a outer surface of a first one of the side walls; a second cover having a central portion extending from a rear side thereof, the second cover coupled to a outer surface of a second one of the side walls; a bolt passing through the first cover, the first end wall, the pivot, the second end wall, and the second cover; and a nut disposed against an outer portion of the second cover, the nut coupled to the bolt.

According to still another aspect of the present invention, the nut and the bolt maintains the pivot and walls of the extension in a state of compression.

According to a further aspect of the present invention, the first cover includes a recessed portion to receive a head portion of the bolt and the second cover includes a wall to hold the nut in position.

According to still a further aspect of the present invention, at least one of the side walls has at least one protrusion extending substantially orthogonal relative to an outer surface of the side wall, and its respective cover has at least one mating portion extending from a surface of an inner side of the cover, the at least one mating portion disposed against the at least one protrusion for preventing rotation of the cover relative to the side wall.

According to a further aspect of the present invention, a screw is coupled to a base portion of the extension, the screw protruding into a cylindrical portion of the extension portion and having threads spaced apart from an inner wall of the cylindrical portion by a predetermined distance, such that a coupling between the base and the extension portion may be threaded into the cylindrical portion, the threads of the screw forming mating threads in an inner wall of the coupling.

According to yet a further aspect of the present invention, the pivot has a first passage disposed in an upper portion of the pivot; and the base portion has a second passage disposed between the side walls and positioned below the first passage, allowing an electrical cord to pass through the first passage, and where the second passage provides clearance for the electrical cord when the fan head assembly is rotated toward a vertical position.

According to yet another aspect of the present invention, the pivot includes a recess adjacent the first passage and the electrical cord includes a strain relief, the stain relief disposed within the recess to maintain the electrical cord in place during pivoting operations.

These and other aspects of the invention are set forth below with reference to the drawings and the description of exemplary embodiments of the invention.

BRIEF DESCRIPTION OF THE DRAWINGS

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following Figures.

DETAILED DESCRIPTION

Figure 1:
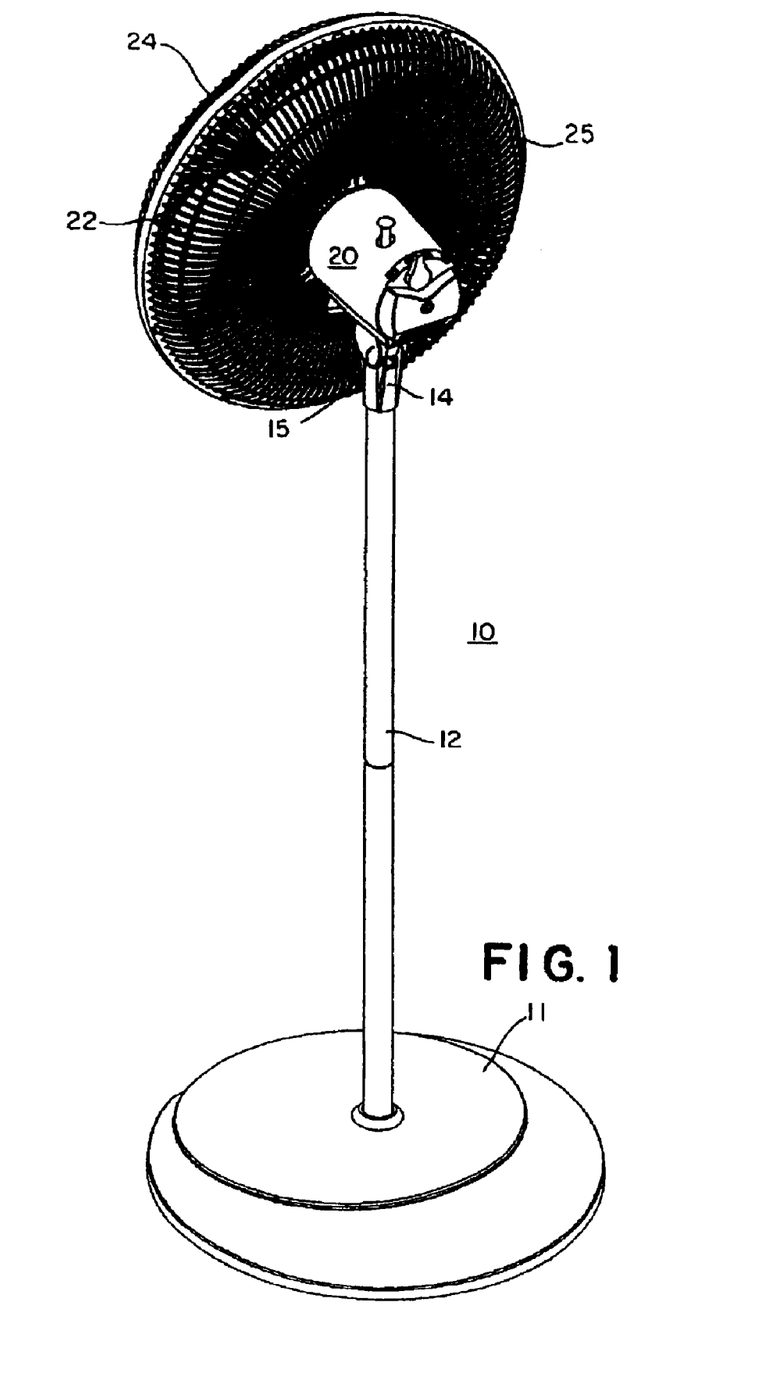
FIG. 1 is a perspective view of a fan incorporating an exemplary embodiment of the present invention.
Figure 2:
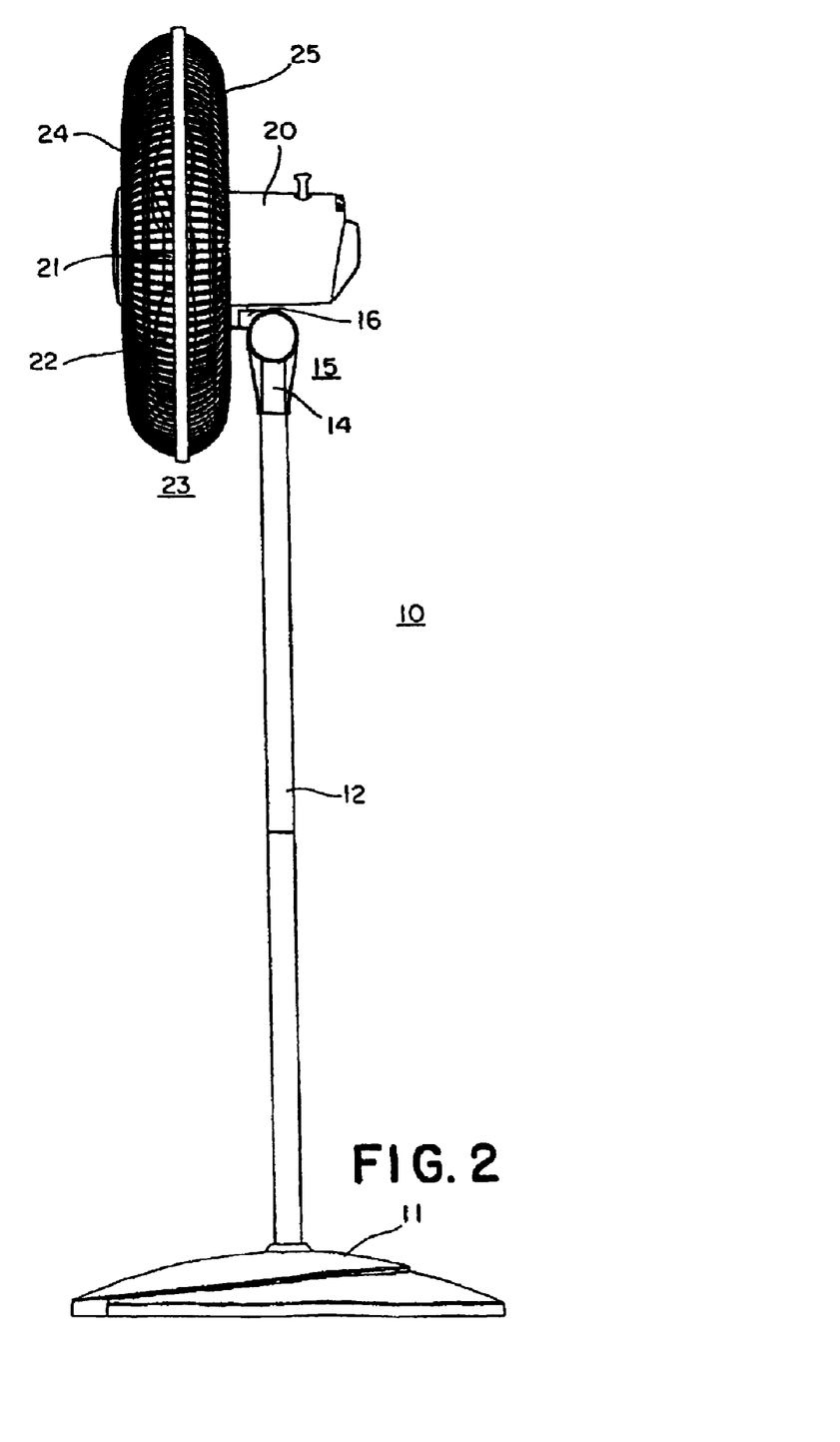
FIG. 2 is a side elevation view of the fan of FIG. 1.
Figure 3:
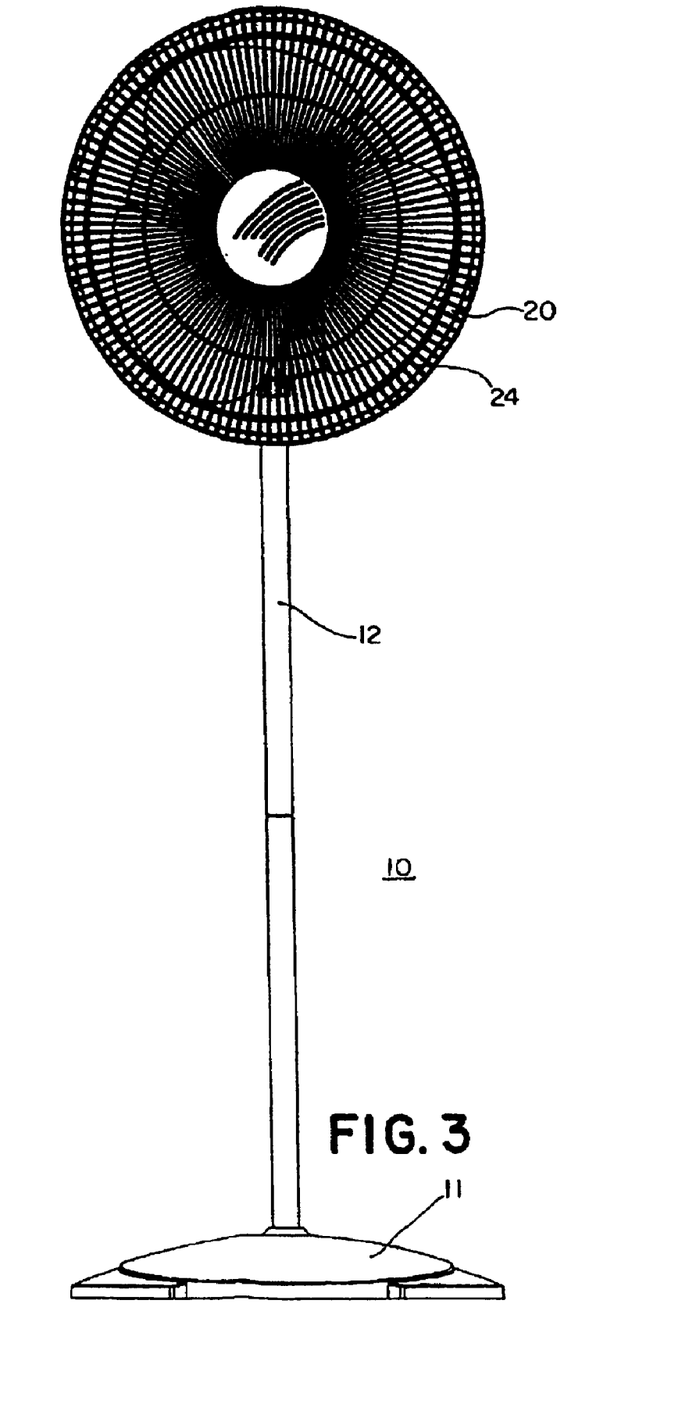
FIG. 3 is a front elevation view of the fan of FIG. 1.

Referring now more particularly to FIGS. 1–3, a fan 10 is illustrated. Fan 10 includes a base 11 with a length of tubing 12 carried therein. Tubing 12 may be a single piece of a desired length or made of multiple pieces coupled together; the latter being for ease of packaging and shipment. Although a pedestal fan is illustrated in association with an exemplary embodiment of the present invention, the invention is no so limited and may be incorporated in other types of fans, such a table top fans, etc.

Tubing 12 is coupled to extension 14 of ratchet assembly 15 (described in detail below). Ratchet assembly 15 has a pivot 16 (to be described), which has a fan motor assembly 20 attached thereto in well known manner, and which can be rotated or oscillated from side to side about ratchet assembly 15.

Referring now to FIG. 2, fan motor assembly 20 has a fan hub 21 extending therefrom, with a plurality of fan blades 22 which are encased in fan grill 23. In the example shown in FIG. 2, fan grill 23 is of a two piece front 24 and rear 25 construction, with rear piece 25 attached to the fan motor assembly 20. Other types of fan grill assemblies may be used, however, without departing from the sprit of the invention.

Figure 4:
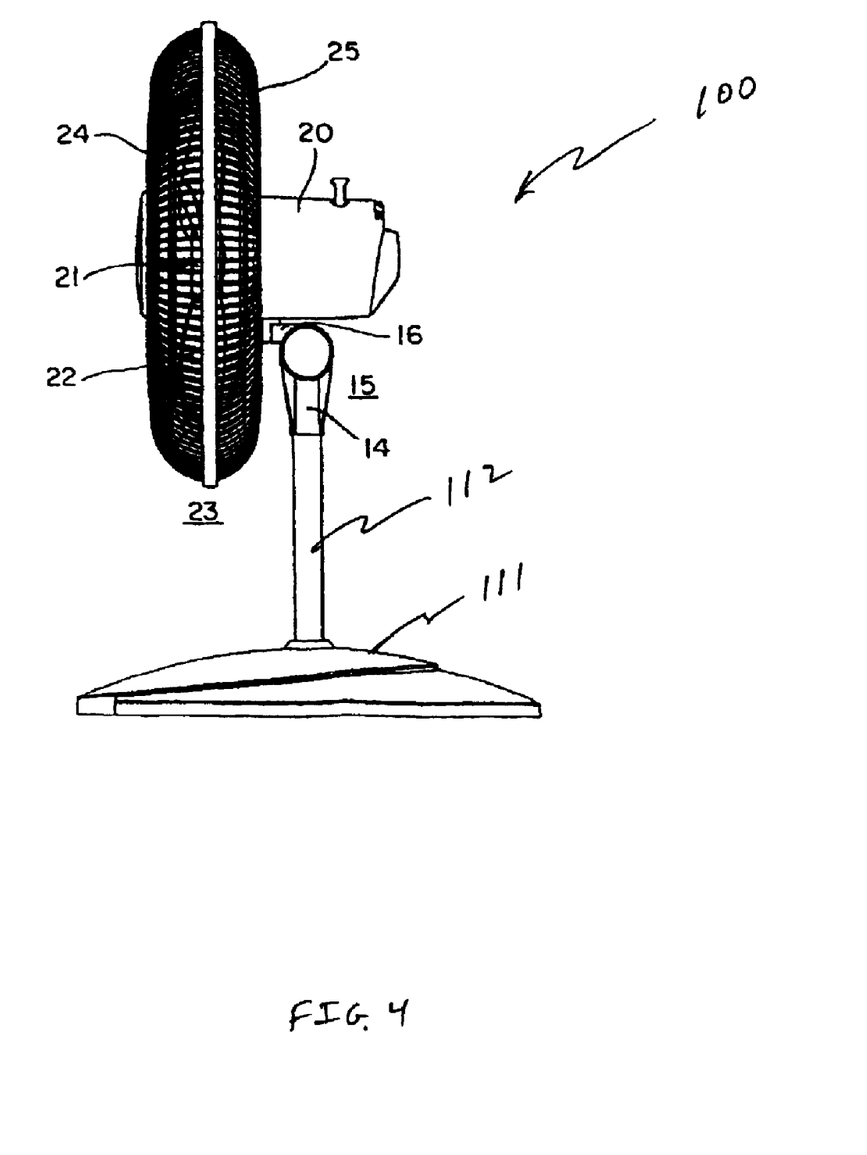
FIG. 4 is a side elevation view of a table fan incorporating an embodiment of the present invention.

FIG. 4 illustrates an example of a tabletop fan 100 having a base 111 coupled to ratchet assembly 15 via tube 112.

Figure 5:
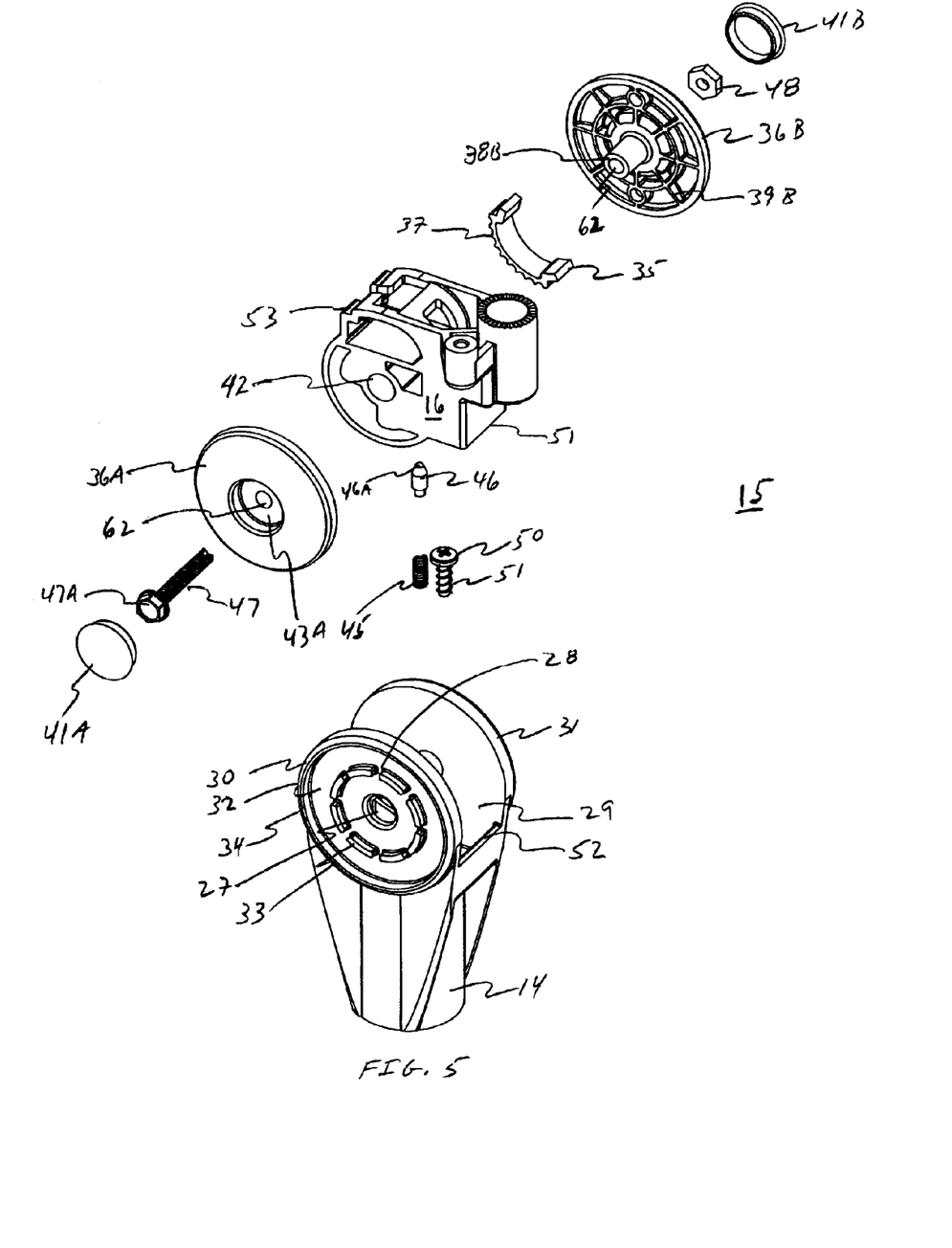
FIG. 5 is an exploded perspective view of the ratchet assembly of the fan according to an exemplary embodiment of the present invention.
Figure 6:
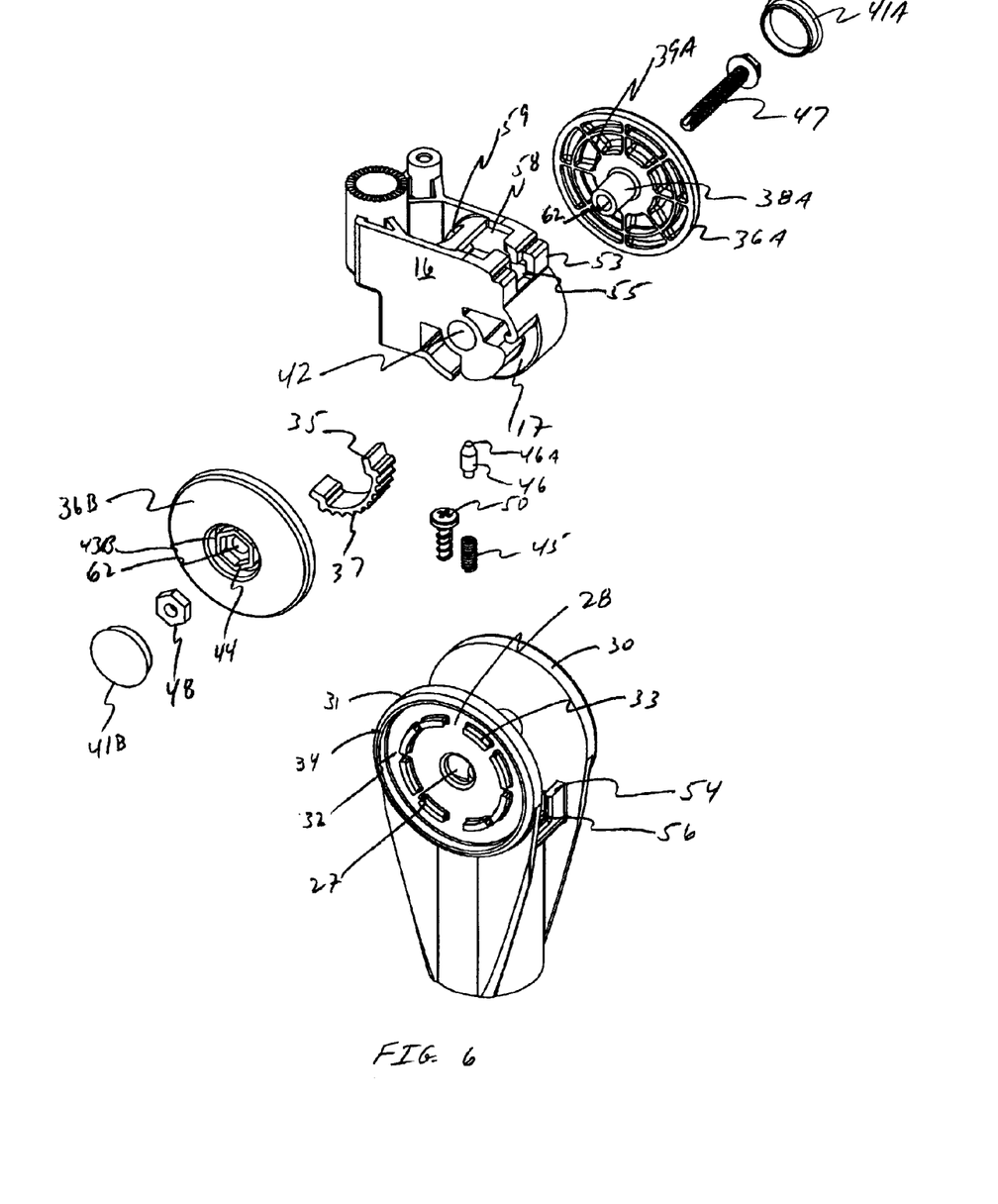
FIG. 6 is a view similar to FIG. 5, but from the opposite side.
Figure 7:
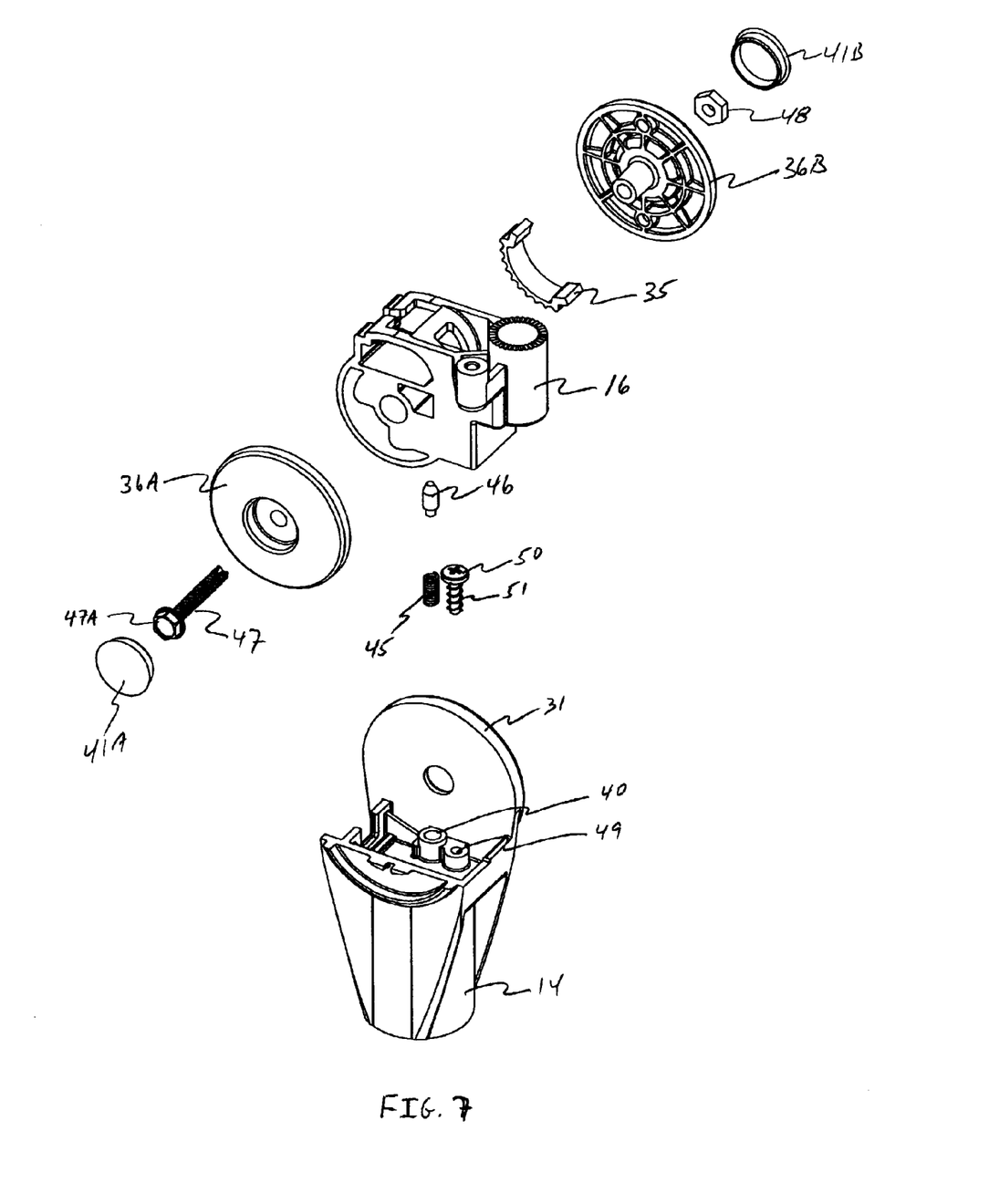
FIG. 7 is a cut away view of FIG. 6 detailing certain features according to an exemplary embodiment of the present invention.

Referring now to FIGS. 5–7, ratchet assembly 15 is illustrated. As shown in FIG. 5, extension 14 has a pair of spaced walls 30 and 31 forming a slot 29 therebetween. Slot 29 receives pivot 16 therein, which pivot 16 can pivot vertically through a desired angle about pivot point 42. In one exemplary embodiment, pivot point 42 may include a through hole. In an exemplary embodiment of the present invention this pivot angle is about 90 degrees. In one exemplary embodiment, the extent of the pivot angle in a horizontal direction may be limited by the engagement of shoulder 51 located on pivot 16 against stop 52 located on extension 14. Likewise, the extent of the pivot angle in a vertical direction may be limited by the engagement of shoulder 53 located on pivot 16 against stop 54 located on extension 14.

Walls 30 and 31 have a circular portion 32. One or both of walls 30, 31 may have a plurality of teeth 33 disposed along a circumference of circular portion 32 and between outer rim 34 and central passage 27. Each of teeth 33 may be spaced apart from one another to form a space 28 between adjacent teeth 33. It is contemplated that either or both of walls 30, 31 may include teeth 33 thereon.

Figure 8:
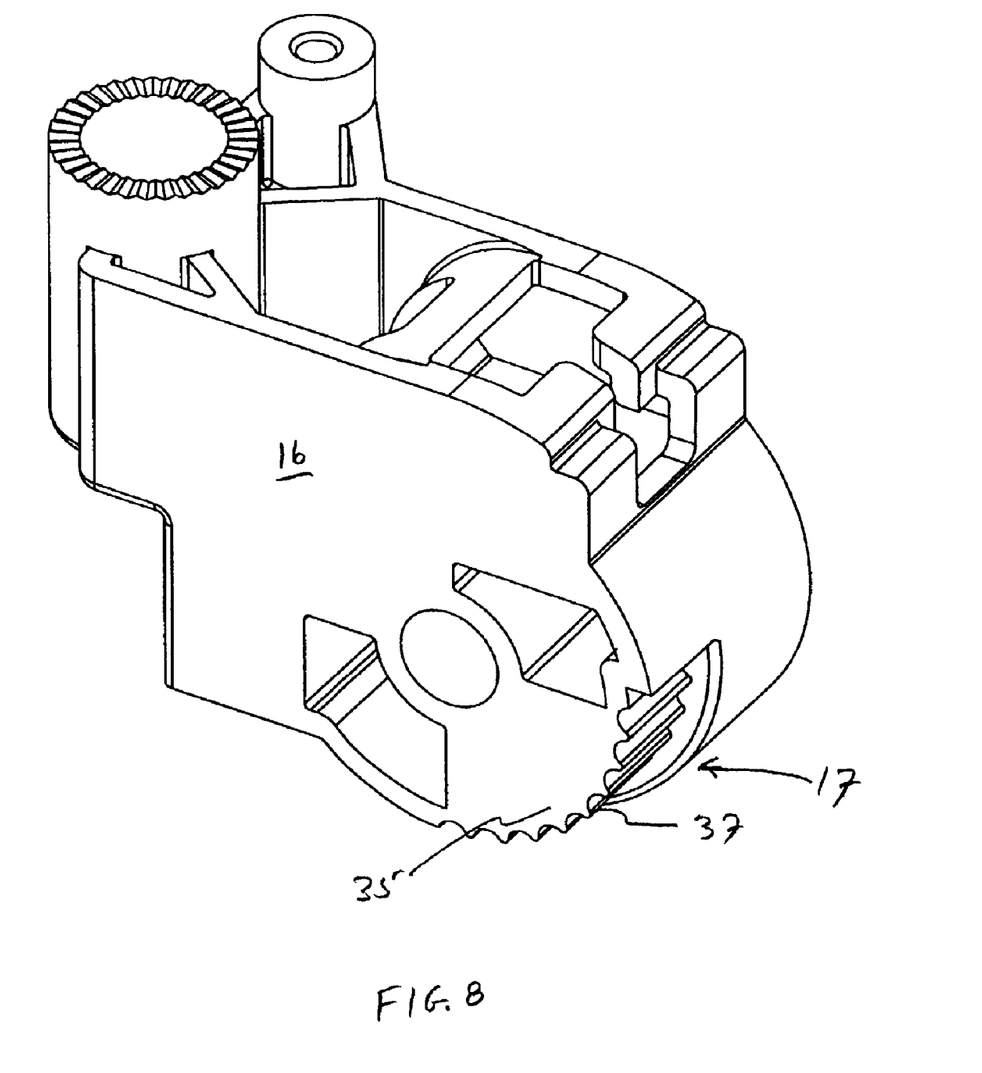
FIG. 8 is a perspective view of a pivot according to a further exemplary embodiment of the present invention.

Member 35 is provided which includes a plurality of teeth 37 spaced apart and parallel to one another. In an exemplary embodiment, member 35 has a semi-circular outer form and fits within pivot 16 at a lower portion 17 thereof, with teeth 37 subtending an arc of greater than 45 degrees and preferably about 90 degrees. In a preferred embodiment, member 35 is formed from a metal, such as aluminum, steel, etc., or a plastic having a high wear resistance. In one exemplary embodiment as illustrated in FIG. 8, member 35 including teeth 37 may be formed as a unitary part of pivot 16.

Referring again to FIG. 7, pin 46 is coupled to spring 45, which fits inside of boss 40 formed within the base of extension 14. Upper portion 46A of Pin 46 has a conical shape and is intended to mesh with teeth 37 of member 35 in an assembled condition. The conical shape of upper portion 46A allows it to ride along ridges 37 of member 35. This provides the user with tactile feedback when the user is repositioning the fan head.

Covers 36A and 36B, preferably having a circular configuration, fit into respective sides of extension member 14 walls 30 and 31. Each cover may include a respective mounting boss 38A and 38B for ease of assembly for location at central passages 27. In a preferred embodiment, mounting bosses 38A, 38B may be long enough to pass through passages 27 and into through hole 42. Further, it is contemplated that mounting boss 38A and 38B may be designed such that their respective lengths provide interference with one another at a mating point within pivot 16 control the force exerted by bolt 47 and nut 48 during assembly. In addition, either or both of covers 36A and 36B may include ribs 39A and/or 39B to provide strength to covers 36A and 36B as well as allowing for mating between teeth 33 of walls 30 and 31. Such mating prevents rotation of covers 36A and 36B during assembly further enhancing ease of assembly.

Figure 9:
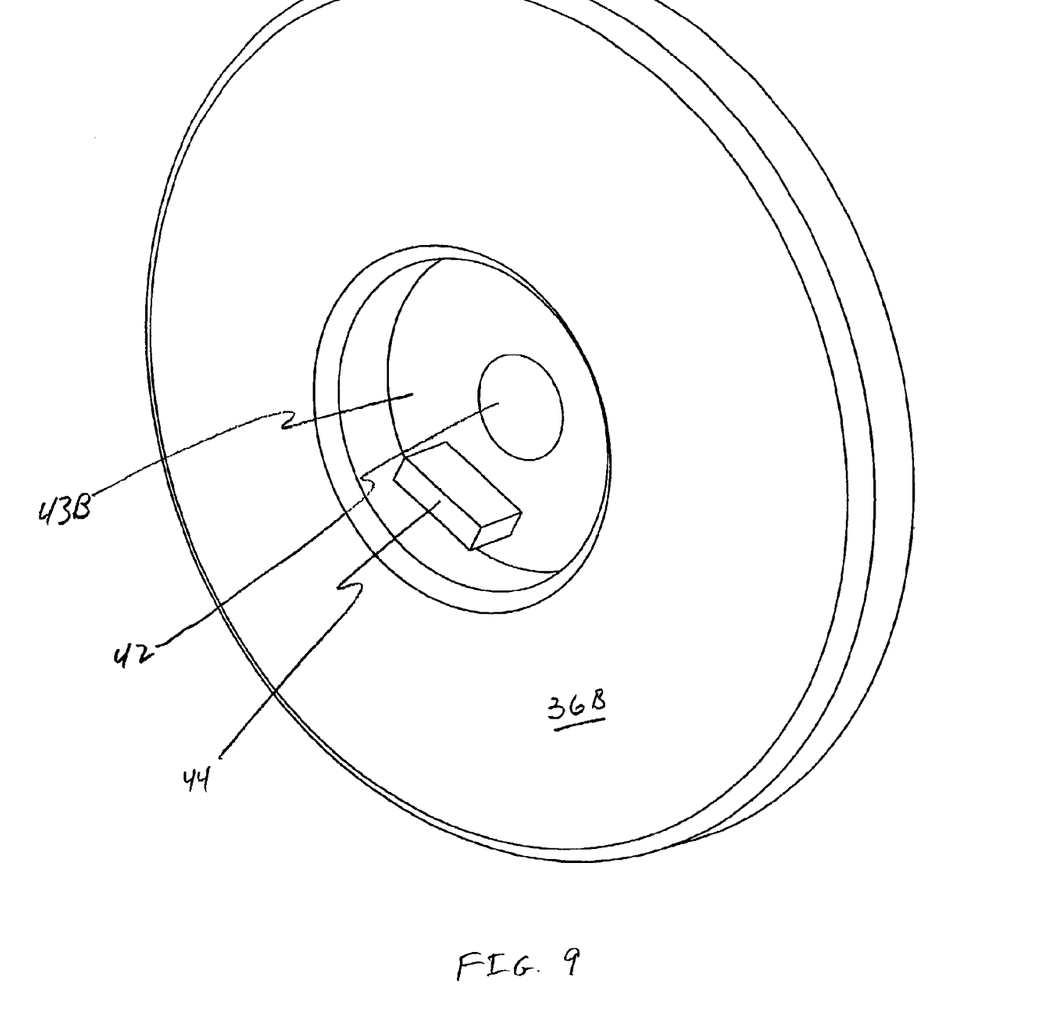
FIG. 9 is an illustration of an end cover according to an alternative exemplary embodiment of the present invention.

In one exemplary embodiment, one of the covers (36A for instance) may include a recess 43A to accommodate the head 47A of bolt 47. In addition, the other cover (36B in this example) may include a recess 43B to accommodate nut 48 therein. Further, recess 43B may also include anti-rotation means 44 to retain nut 48 in position for ease of assembly. In one exemplary embodiment, such anti-rotation means 44 may be a continuous wall having a shape of nut 48 (in this example a hexagon). Alternatively, anti-rotation means 44 may be at least one wall member as illustrated in FIG. 9, thereby accommodating any of several type of nuts, such as square nuts, hexagonal huts, octagonal nuts, etc. This has a further advantage of reducing inventory or allowing for the easy substitution of one type of nut for another in the event of a shortage of a preferred part.

An additional advantage of the anti-rotation design of covers 36A and 36B combined with anti-rotation means 44 is the prevention of the inadvertent loosening of nut 48 and bolt 47 after repetitive pivoting operations, thus providing a safety factor, in that the fan head assembly will not change position unintentionally.

Figure 10A:
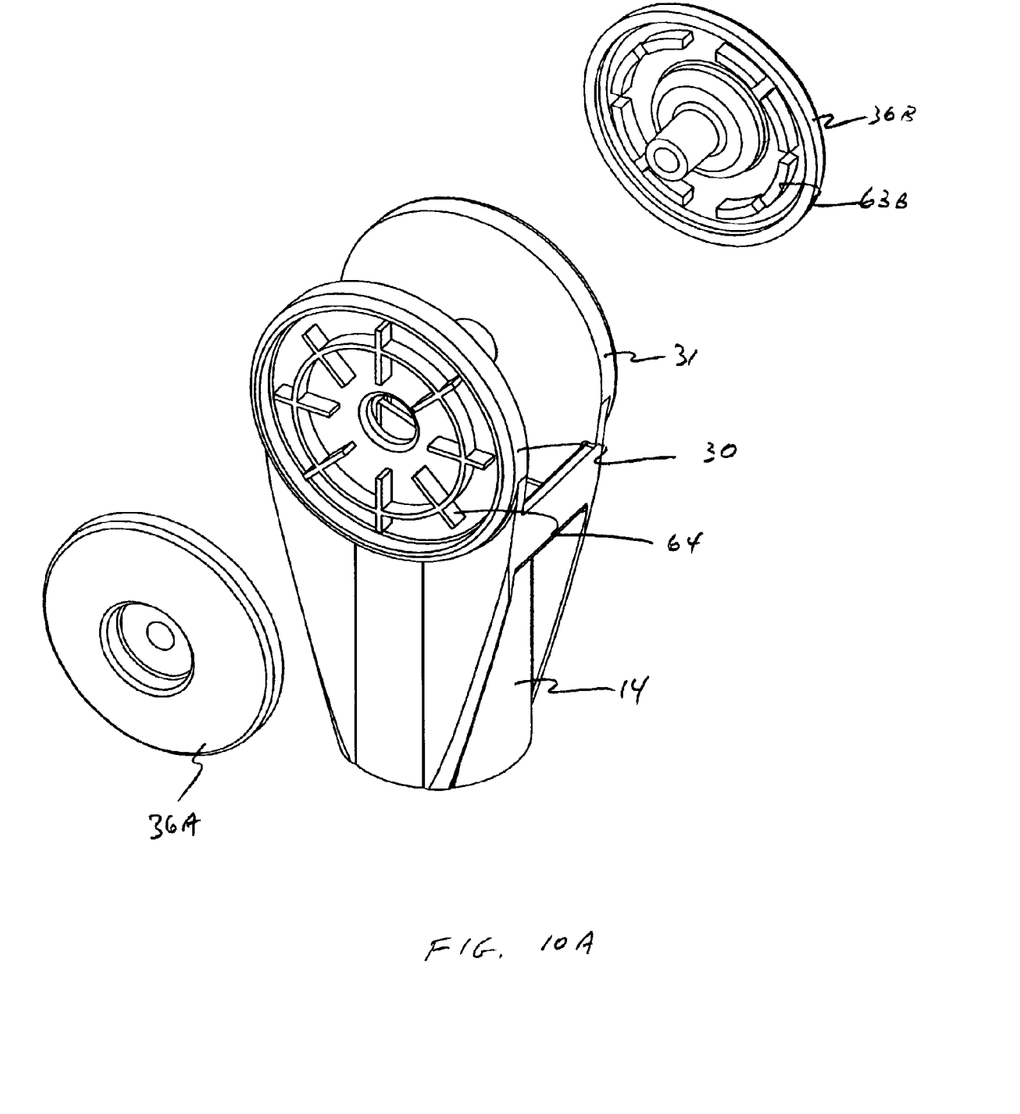
FIGS. 10A–10B illustrate an alternative embodiment of the present invention.
Figure 10B:
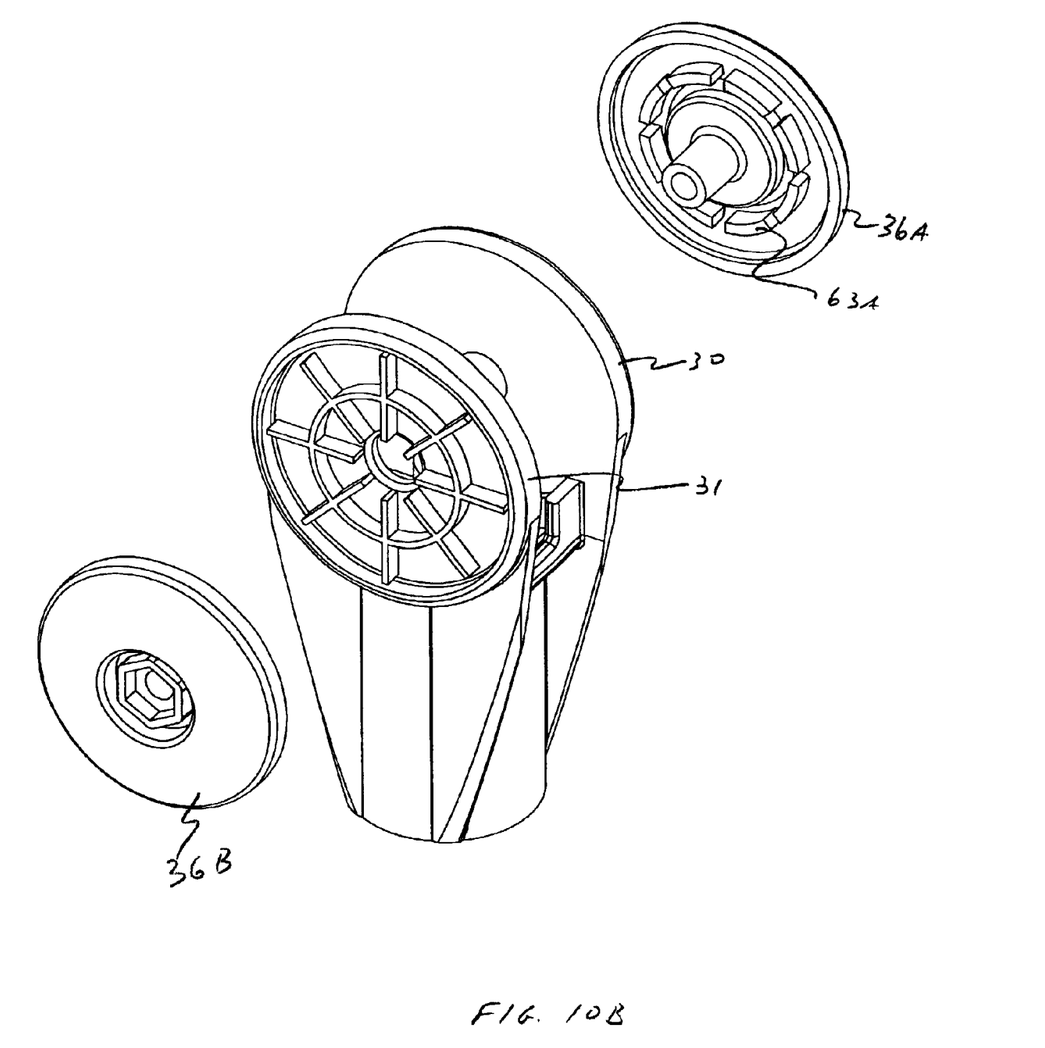

Although the exemplary embodiment shown in FIGS. 5–7 illustrates radially extending ribs 36A, 36B and circularly arranged teeth 33 on wall 30, 31, the invention is not so limited. It is contemplated that, and as illustrated in FIGS. 10A and 10B, radially extending ribs 64 may be placed on the outer surface of walls 30, 31 and circularly arranged teeth 63A, 63B, for mating with such radial ribs, may be placed on the inside portions of one or both covers 36A, 36B, respectively.

Referring again to FIGS. 5 and 6, caps 41A and 41B may be included and mate with recesses 43A and 43B, respectively, to provide a finished look to the assembly as well as inhibiting access to bolt 47 and nut 48 after assembly.

As mentioned above, prior art devices use a counterbalance spring disposed around the pivot point of the mechanism to provide pressure between the base portion and the pivot portion of these devices to maintain the fan head in position. Inherent with the use of a counterbalance spring is a limitation to the range of motion due to the excessive torsion introduced by the counterbalance spring as the angle of pivot increases. Accordingly, prior art pivots are limited to an angular motion of less than 45 degrees. In the exemplary embodiment of the present invention, removal of the counterbalance spring increases the available range of motion, and increases of surface area of pivot 16 with respect to the side walls to provide greater friction under compression between pivot 16 and extension 14 thereby allowing the maintenance of the fan head position.

Further, the use of the coupling to provide compression, in combination with the structure in the cover 36A and 36B described above, spreads the compression force provided by bolt 47 and nut 48 throughout i) inner boss area 65A, 65B, ii) ribs 39A, 39B, and periphery 66A, 66B of cover 36A, 36B, and iii) onto substantially all of surface area 16A, 16B of pivot 16. Thus, providing greater friction between walls and pivot 16 to maintain the position of pivot 16 relative to extension 14 in the presence of forces exerted by fan head assembly 20 on pivot 16.

Figure 11:
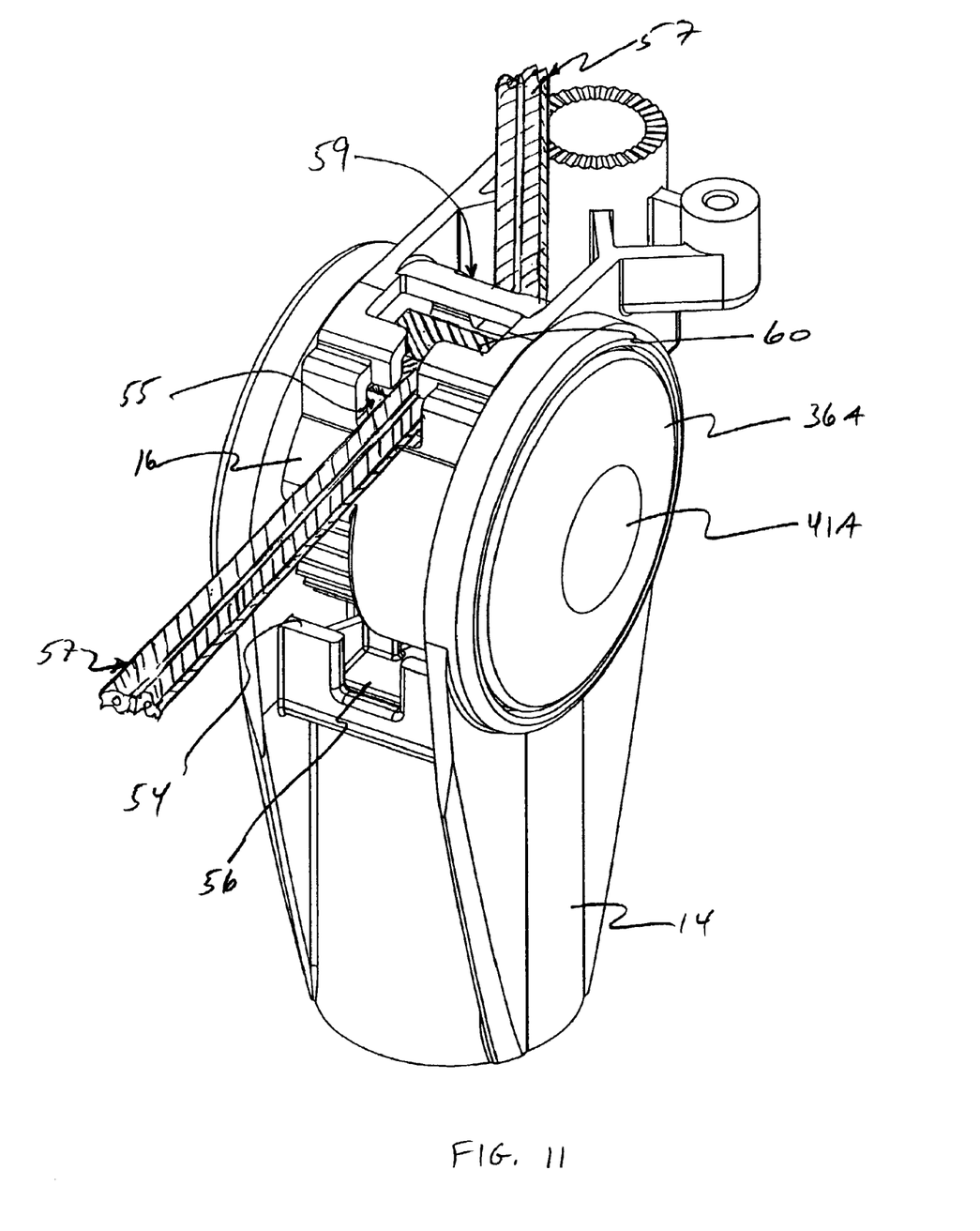
FIGS. 11 and 12 illustrate details relating to the passage of a cord set through a potion of the pivot according an exemplary embodiment of the present invention.

Referring now to FIG. 11, the details of the passage of wiring to fan head assembly 20 is illustrated. As shown in FIG. 11, a first passage 55 is formed at an upper rear portion of pivot 16 and a second passage 59 is formed at an upper central portion of pivot 16. A wire clearance passage 56 is formed between walls 30, 31 and within stop 54 of extension 14. Wire set 57 passes through passage 55 and passage 59 with strain relief 60 positioned within portion 58, which is between first passage 55 and second passage 59. The end of wire set 57 (not shown) is connected to fan head assembly according to known methods.

When ratchet assembly 15 is in a horizontal orientation, wire set 57 exits passage 55 and may be dressed along tubing 12 as desired to a source of electrical energy. Stain relief 60 and its containment within portion 58 controls the strain on wire set 57 at motor assembly 20.

Figure 12:
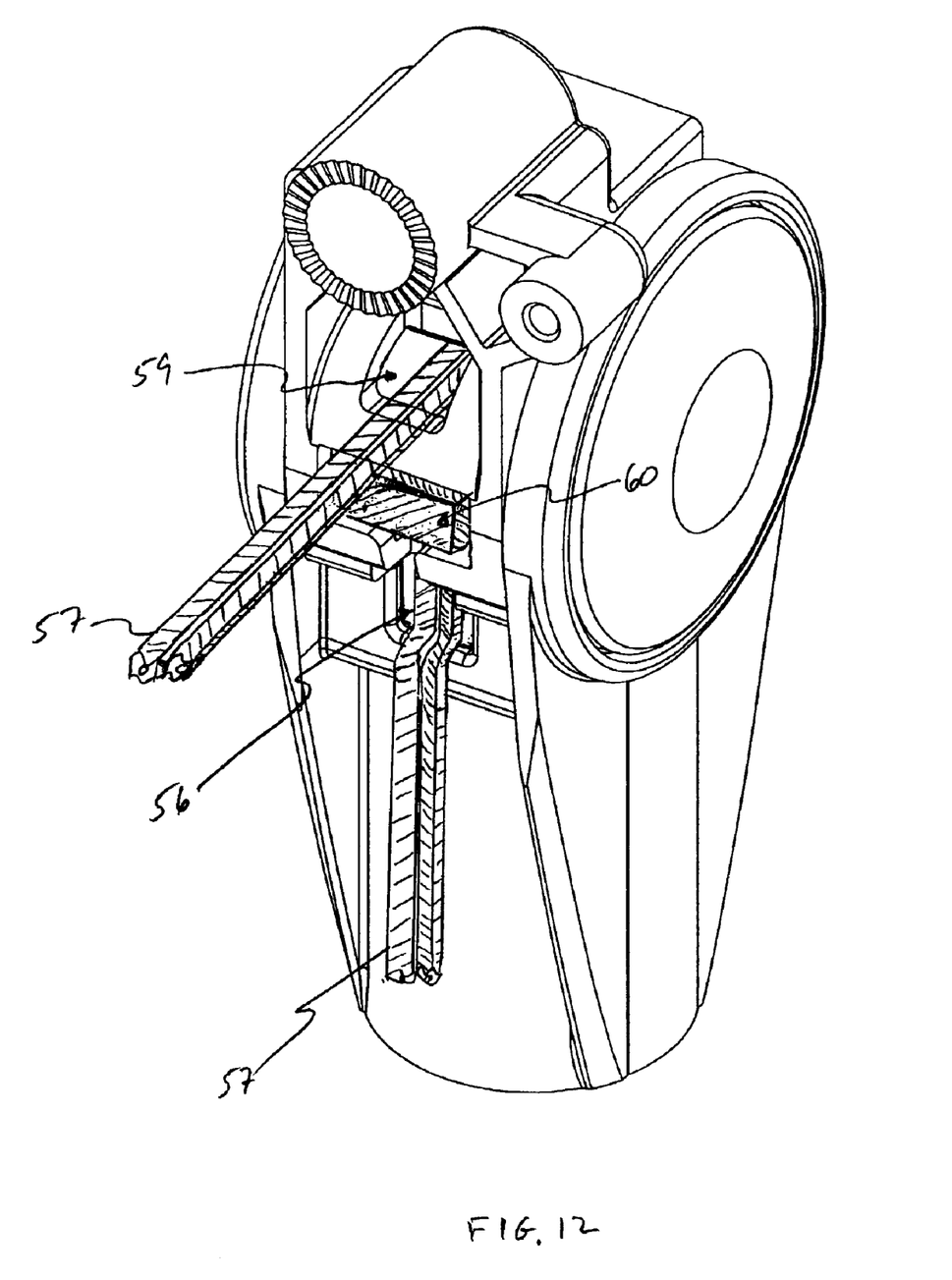

As shown in FIG. 12, when ratchet assembly 15 approaches a vertical orientation, wire set 57 exits passage 55 and is provided clearance from pinching at extension 14 by passage 56. In this way, as ratchet assembly 15 is tilted between the vertical and horizontal positions, and visa versa, wire set 57 maintains its position relative to fan head assembly 20 without undue flexing or pinching to induce fatigue and ultimate failure.

The mode of operation will now be described.

The ratchet assembly is constructed by placing spring 45 and pin 46 within boss 40 of extension 14. In the case of one exemplary embodiment, screw 50 is also seated within boss 49 of extension 14. Next, member 35 is placed within lower portion 17 of pivot 16, and this combination placed between the walls 30 and 31. Covers 36A and 36B are placed on opposite sided of extension assembly 14 such that respective bosses 38A and 38B pass through central passage 27 of extension 14 and into passage 42 of pivot 16, and, if so equipped, radial ribs 39A and/or 39B are engaged within space 28 between teeth 33 of walls 30 and/or 31. The assembly is completed by insetting bolt 47 through passage 62 of cover 38A to engage with nut 48 positioned within cover 36B. Bolt 47 and nut 48 are then tightened as required to maintain a state of compression between walls 30, 31 and pivot 16. The compression provided by bolt 47 and nut 48, in combination with the construction of pivot 16, walls 30, 31 and covers 36A, 36B, provide sufficient force to maintain pivot 16 in position without the need for a counterbalance spring. In addition, not only does assembly 15 control the unintended tilting of motor assembly 20, fan motor assembly 20 may be easily repositioning without the need for loosening or tightening of bolts or nuts. Optional caps 41A and 41B may be placed in covers 36A and 36B, respectively, to prevent access to bolt 47 and nut 48.

To position motor assembly 20 at a desired degree of tilt, the user merely places pressure upwardly or downwardly in fan assembly 20. As mentioned above, the user is not required to loosen or tighten any bolts or other retaining means to reposition motor assembly 20 or to maintain its position.

Figure 13:
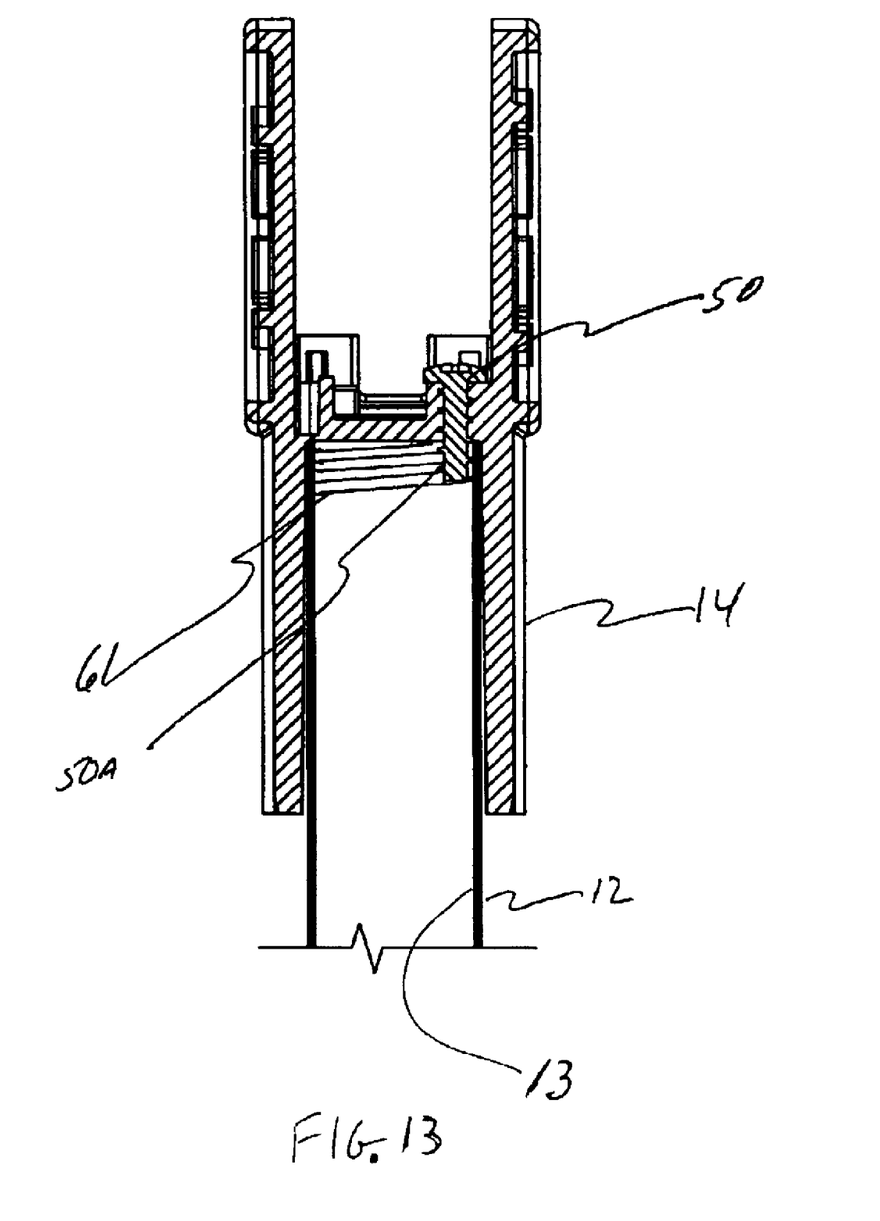
FIG. 13 is a partial cross sectional view illustrating the engagement of a support post with a base portion of the ratchet assembly according to an exemplary embodiment of the present invention.

In one exemplary embodiment, extension 14 may be coupled to tubing 12 by inserting an end portion of tubing 12 into extension 14 using a twisting operation. In this way, and as illustrated in FIG. 13 the wall of tubing 12 engages the lower portion of threads 50A of screw 50 and forms mating threads 61 along a portion of inner wall 13.

Fan motor assembly 20 is attached to pivot 16 and the fan positioned by rotation of pivot 16 from an horizontal position to a vertical position or visa versa, which causes upper portion 46A of pin 46, under compression of spring 45, to ride over teeth 37 until a selected position is reached, whereupon the force of spring 45 against pin 46 and member 35 causes the retention of member 35 in the selected position.

Although the invention has been described with reference to exemplary embodiments, it is not limited thereto. Rather, the appended claims should be construed to include other variants and embodiments of the invention, which may be made by those skilled in the art without departing from the true spirit and scope of the present invention.

What is claimed:

1. A pivoting mechanism for a fan having a base and a head assembly, the mechanism comprising:

an extension portion having side walls spaced apart from one another;

a pivot disposed between the side walls of the extension portion having a first portion for attaching the fan head assembly; and a coupling placed through the pivot and at least one of the side walls, the coupling being absent a user adjustable tightening and/or loosening member and the coupling compressing the side walls against the pivot to maintain a position of the fan head assembly relative to the extension portion, wherein the coupling is substantially stationary relative to the extension portion during pivoting of the fan head assembly about the coupling and the coupling maintains a predetermined compression of the side walls against the pivot after repetitive pivoting operations of the fan head assembly.

2. A pivoting mechanism for a fan having a base and a head assembly, the mechanism comprising:
   a pivot having a first portion for attachment with the fan head assembly;
   a member disposed within a portion of the pivot;
   an extension portion having side walls spaced apart from one another, the pivot and member disposed between the side walls of the extension portion;
   a pin having a lower portion seated within a base portion of the extension portion, an upper portion of the pin resiliently placed against the member; and
   a coupling placed through the pivot and at least one of the side walls, the coupling compressing the side walls against the pivot to maintain a position of the fan head assembly and allowing bi-directional pivoting of the pivot relative to the extension portion absent a tightening and a loosening of the couplings,
   wherein the coupling maintains a predetermined compression of the side walls against the pivot after repetitive pivoting operations.

3. The pivoting mechanism according to claim 2, wherein the member is a unitary part of the pivot.

4. The pivoting mechanism according to claim 2, wherein the member has a plurality of ridges spaced apart from one another along at least a portion of a length of the member, the upper portion of the pin disposed between a pair of the plurality of ridges to maintain a position of the pivot relative to the extension portion.

5. The pivoting mechanism according to claim 4, wherein the plurality of ridges are parallel to one another.

6. The pivoting mechanism according to claim 4, wherein the member is formed from a metal.

7. The pivoting mechanism according to claim 2, wherein the upper portion of the pin has a conical shape.

8. The pivoting mechanism according to claim 2, further comprising:
   a spring placed between the lower portion of the pin and the base portion such that the upper portion of the pin maintains a positive pressure against the member.

9. The pivoting mechanism according to claim 1, wherein the pivot tilts within about a 90 degree range.

10. The pivoting mechanism according to claim 1, further comprising:
    a first shoulder at a first position on the pivot and a second shoulder at a second position on the pivot, the first shoulder being approximately orthogonal to the second shoulder; and
    a first stop at a front portion of the extension portion and a second stop at a rear portion of the extension portion, wherein an extent of tilt is based upon an interference of said first shoulder with said first stop and an interference of said second shoulder with said second stop.

11. The pivoting mechanism according to claim 1, wherein the coupling includes:
    a bolt passing through the side walls and the pivot; and
    a nut coupled to the bolt.

12. The pivoting mechanism according to claim 11, wherein the coupling further includes:
    a first cover having a central portion extending from a rear side thereof, the first cover coupled to a outer surface of a first one of the side walls;
    a second cover having a central portion extending from a rear side thereof, the second cover coupled to a outer surface of a second one of the side walls;
    wherein the bolt passes through the first cover and the second cover.

13. The pivoting mechanism according to claim 12, wherein the first cover includes a recessed portion to receive a head portion of the bolt and the second cover includes a wall to hold the nut in position.

14. The pivoting mechanism according to claim 12, further comprising a first cap disposed within the first cover and a second cap disposed within the second cover.

15. The pivoting mechanism according to claim 12, wherein i) the first cover and the first side wall and ii) the second cover and the second side wall are each keyed relative to each other to prevent rotation of the covers with respect to their respective side walls.

16. The pivoting mechanism according to claim 12, wherein at least one of the side walls has at least one protrusion extending vertically relative to an outer surface of the side wall, and a respective cover has at least one rib extending radially outward from a central portion of an inner side of the cover, the at least one rib disposed against the at least one protrusion for preventing rotation of the cover relative to the side wall.

17. The pivoting mechanism according to claim 12, wherein at least one of the side walls has at least one rib extending radially outward from a central portion of an outer portion of the side wall, and a respective cover has at least one protrusion extending vertically from an inner side of the cover, the at least one rib disposed against the at least one protrusion for preventing rotation of the cover relative to the side wall.

18. The pivoting mechanism according to claim 1, further comprising:
    a first passage disposed between the side walls of the extension portion; and
    a second passage disposed at an upper portion of the pivot, the second passage positioned above the first passage.

19. The pivoting mechanism according to claim 18, wherein an electrical cord associated with the fan head assembly passes through the second passage, and the first passage provides clearance for the cord when the fan head assembly is rotated toward a vertical position.

20. The pivoting mechanism according to claim 18, wherein the second passage is disposed in a rear portion of the pivot.

21. The pivoting mechanism according to claim 1, further comprising:
    a screw coupled to a base portion of the extension portion, the screw protruding into a cylindrical portion of the extension portion, the screw having threads spaced apart from an inner wall of the cylindrical portion by a predetermined distance such that a coupling between the base and the extension portion may be threaded into the cylindrical portion, the threads of the screw forming mating threads in an inner wall of the coupling.

22. The pivoting mechanism according to claim 1, wherein the fan is a pedestal fan.

23. The pivoting mechanism according to claim 1, wherein the fan is a table fan.

24. The pivoting mechanism according to claim 1, wherein the fan is an oscillating fan.

25. A pivoting mechanism for a fan having a base and a head assembly, the pivoting mechanism comprising:
    pivoting means coupled to the head assembly for pivoting the head assembly relative to the base through an angle greater than 45 degrees;
    positioning means disposed within a portion of the pivoting means;
    extension means having supporting means spaced apart from one another, the pivoting means and positioning means disposed between the supporting means;

friction means disposed in a lower portion the extension means for providing friction to the positioning means; and coupling means for coupling the pivoting means and the extension means to one another;

wherein the coupling means is substantially stationary relative to the extension portion during a positional rotation of the fan head assembly about the coupling.

26. A neck assembly for a fan comprising:

a base having side walls spaced apart from one another;

a pivot disposed between the side walls;

a member having ridges, the member disposed between a lower portion of the pivot and a central portion of the base portion; and a pin having a lower portion seated within the base portion, an upper portion of the pin placed against the ridges to maintain a position of the pivot, a coupling placed through the pivot and at least one of the side walls, the coupling compressing the side walls against the pivot to maintain a position of the pivot;

wherein the coupling maintains the compression of the side walls against the pivot.

27. A neck assembly according to claim 26 wherein the member having ridges is a unitary part of the pivot.

28. A pivoting mechanism for a fan comprising:

a pivot having a plurality of ridges along a circumferential portion thereof, the plurality of ridges extending over an arc of greater than 45 degrees;

an extension portion having side walls spaced apart from one another, the pivot between the side walls;

a pin seated within a base portion of the extension portion, an upper portion of the pin engaging at least one of the plurality of ridges; and a coupling placed through the pivot and at least one of the side walls the to maintain a state of compression between the side walls and the pivot.

29. A pivoting mechanism according to claim 28, wherein the pivot rotates relative to the extension portion and the coupling is substantially stationary relative to the extension portion during the rotation.

30. A device for tilting a fan having a head assembly, the device comprising:

a pivot having:
  i) a first shoulder at a first position on the pivot, and
  ii) a second shoulder at a second position on the pivot, the first shoulder being approximately orthogonal to the second shoulder;

a member having a plurality of ridges along at least a portion of a length of the member, the member disposed within a lower portion of the pivot;

an extension portion having:
  i) side walls spaced apart from one another,
  ii) a first stop at a front portion of the extension portion, and
  iii) a second stop at a rear portion of the extension portion, the pivot and member disposed between the side walls of the extension portion, such that an extent of tilt is based upon an interference of said first shoulder with said first stop and an interference of said second shoulder with said second stop;

a pin having a lower portion seated within a base portion of the extension portion, an upper portion of the pin resiliently placed against the collar;

a coupling placed through the pivot and at least one of the side walls, the coupling maintaining the pivot and extension portion in a state of compression;

a first passage disposed between the side walls of the extension portion; and a second passage disposed at an upper portion of the pivot, the second passage positioned above the first passage;

wherein at least a pair of the plurality of ridges define a predetermined position of the pivot relative to the extension portion.

31. A device according to claim 30, wherein the pivot rotates relative to the extension portion and the coupling is substantially stationary relative to the extension portion during the rotation.

32. A device according to claim 30, wherein an electrical cord associated with the fan head assembly passes through the second passage, and the first passage provides clearance for the cord when the fan head assembly is rotated toward a vertical position.

33. A pivoting mechanism for use with a fan having an electrical cord, the mechanism comprising:

a pivot having a first passage disposed in an upper portion of the pivot; and a base portion having side walls spaced apart from one another, the pivot disposed between the side walls, the base portion having a second passage disposed between the side walls and positioned below the first passage, wherein the electrical cord passes through the first passage, and the second passage provides clearance for the electrical cord when the fan head assembly is rotated toward a vertical position.

34. A mechanism according to claim 33, wherein the pivot includes a recess adjacent the first passage and the electrical cord includes a strain relief, the stain relief disposed within the recess to maintain the electrical cord in place during a pivoting of the mechanism.

35. A neck assembly according to claim 26, wherein the position of the pivot is adjusted and maintained absent a tightening and a loosening of the coupling.

36. A neck assembly according to claim 26, wherein the coupling is substantially stationary relative to the base during movement of the pivot relative to the base.

37. A pivoting mechanism for a fan having a base and a head assembly, the mechanism comprising:

an extension portion having side walls spaced apart from one another;

a pivot disposed between the side walls of the extension portion having a first portion for attaching the fan head assembly; and means for coupling the pivot and the extension portion by compression for maintaining a position of the fan head assembly relative to the extension portion during pivoting of the fan head assembly about the coupling, and the fan head assembly maintains a position relative to the extension portion after the pivoting i) absent a loosening of the coupling prior to the pivoting and ii) absent a tightening of the coupling subsequent to the pivoting.

* * * * *